United States Patent
Muzicant

(10) Patent No.: US 7,864,389 B2
(45) Date of Patent: Jan. 4, 2011

(54) METHOD OF CONTROLLING OPTICAL AMPLIFIER LOCATED ALONG AN OPTICAL LINK

(75) Inventor: Tal Muzicant, Misgav (IL)

(73) Assignee: ECI Telecom Ltd., Petach Tikva (IL)

( * ) Notice: Subject to any disclaimer, the term of this patent is extended or adjusted under 35 U.S.C. 154(b) by 361 days.

(21) Appl. No.: 11/722,788

(22) PCT Filed: Dec. 20, 2005

(86) PCT No.: PCT/IL2005/001364

§ 371 (c)(1),
(2), (4) Date: Mar. 24, 2008

(87) PCT Pub. No.: WO2006/067788

PCT Pub. Date: Jun. 29, 2006

(65) Prior Publication Data

US 2008/0232797 A1 Sep. 25, 2008

(30) Foreign Application Priority Data

Dec. 23, 2004 (IL) .................... 165958

(51) Int. Cl.
*H04B 10/08* (2006.01)
*H04B 10/02* (2006.01)
*H04J 14/02* (2006.01)
(52) U.S. Cl. .................. 359/33; 398/94; 398/15; 398/17; 398/160
(58) Field of Classification Search .......... 398/9, 398/15–17, 25, 30–33, 93, 94, 160
See application file for complete search history.

(56) References Cited

U.S. PATENT DOCUMENTS

| 5,428,471 | A  | * | 6/1995  | McDermott ............... 398/181 |
| 5,859,716 | A  | * | 1/1999  | O'Sullivan et al. ........... 398/17 |
| 6,373,621 | B1 |   | 4/2002  | Large et al. |
| 6,504,630 | B1 | * | 1/2003  | Czarnocha et al. ........... 398/15 |
| 6,626,587 | B1 |   | 9/2003  | Marmur |
| 6,681,079 | B1 |   | 1/2004  | Maroney |
| 6,724,993 | B2 | * | 4/2004  | Koike et al. ................... 398/9 |
| 6,807,001 | B1 |   | 10/2004 | Ranka et al. |

(Continued)

FOREIGN PATENT DOCUMENTS

EP 0903875 A2 3/1999

(Continued)

OTHER PUBLICATIONS

ITU-T Standard Recomendation G.664, "Optical safety procedures and requirements for optical transport systems", Mar. 2003, pp. 7-17.

*Primary Examiner*—Dalzid Singh
(74) *Attorney, Agent, or Firm*—Browdy and Neimark, PLLC

(57) ABSTRACT

The invention concerns shutting down and restarting optical amplifiers, such as Raman amplifiers, in an optical link, depending whether the optical amplifier is a transmitting side amplifier or a receiving side amplifier. For controlling the amplifiers, at least one diagnostic signal is to be transmitted via an auxiliary optical channel in the optical link, and a number of physical events simultaneously taking place are to be taken into account to conclude whether to shut down or to restart one of the optical amplifiers.

11 Claims, 3 Drawing Sheets

U.S. PATENT DOCUMENTS

| | | |
|---|---|---|
| 7,409,155 B2 * | 8/2008 | Takahashi .................... 398/30 |
| 2003/0072064 A1 | 4/2003 | Ohta |
| 2004/0208519 A1 | 10/2004 | Feldman et al. |
| 2005/0063700 A1 | 3/2005 | Shin et al. |

FOREIGN PATENT DOCUMENTS

| | | |
|---|---|---|
| EP | 1041747 A2 | 10/2000 |
| EP | 1229382 A1 | 8/2002 |

* cited by examiner

METHOD OF CONTROLLING OPTICAL AMPLIFIER LOCATED ALONG AN OPTICAL LINK

FIELD OF THE INVENTION

The invention relates to a technology of shutting down and restarting power optical amplifiers (more particularly, Raman amplifiers) in optical links.

BACKGROUND OF THE INVENTION

Various methods for safe connection and disconnection of high power optic amplifiers in optical links have been discussed in the prior art.

It is understood that the basic reason for shutting down lasers of the optical amplifiers is a fiber cable cut (break) or disconnection in the line; the fiber cut leads to emission of high energy light at the break point, which may cause hazardous consequences to human eyes. The most natural and widely used classic criterion indicating a fiber break is a Loss Of Signal (LOS) in the wavelengths band intended for transmitting the informational optical channels (i.e., in the C-band), being detected at the receiving point of the optical line.

In optical lines deploying power Raman amplifiers, a number of non-linear effects usually develop; therefore, the above-mentioned criterion of LOS cannot be used as a universal one for detecting fiber faults of various natures.

U.S. Pat. No. 6,373,621 to Nortel Networks corporation describes a method of operating Raman amplification pump lasers, especially in telecommunication systems, in which the Raman pump laser output powers are modulated in characteristic fashions. Parameters of these characteristic modulations may be detected at remote locations (i.e. locations along the communications fibres) even in the presence of large amounts of noise. Thus, by detecting losses of signals indicative of the characteristic modulations, breaks in the communication fibres can be detected more reliably. The disappearance of these signals can then be used to shut down the typically high power Raman pump lasers, thereby reducing the possibility of high laser powers escaping from the broken fibres. The above solution also describes an improved method of detecting the disappearance of a data signal at an amplifier unit, using a periodic filter to split the incoming signal into two streams, the first stream comprising data and noise, and the second comprising noise only. These two streams are then monitored to provide an indication of the presence or absence of the data signal alone. This form of signal detection can be combined with the technique of modulating the Raman pump laser output power to provide even further improved break detection and subsequent safe shut down of pump lasers.

An ITU-T Standard Recommendation G.664 (dated March 2003) named "Optical safety procedures and requirements for optical transport systems" proposes some examples of Automatic Power Reduction (APR) and Automatic Laser Shutdown (ALS) procedures for systems including those based upon Raman amplifiers. Appendixes 1 and 2 of the G.664 proposes using an Optical Supervisory Channel (OSC), when present in the system, to verify link connectivity for performing a restart. Since an OSC is usually operating at a safe optical power level, it can be kept "alive" on the fibre after the power has been reduced to a safe level. Restoration of OSC communication indicates full restoration of the link connectivity, after which the system can be brought back to its full operational power. In this way, it is ensured that the full operational power is only present in a fully enclosed configuration guaranteeing optical safety.

The ALS procedure concerns restart of communication in an optical link, and is based on the use of repetitive pulses to restart the system. The Standard Recommendation specifies the minimum delay between the restart pulses for various conditions (for example, between 100 s-300 s), wherein their duration (i.e., the time period when the transmitter Tx is on) can be of about $(2\pm0.25)$s.

U.S. Pat. No. 6,626,587 B1 to ECI Telecom Ltd. describes different modes of ALS procedure in optical telecommunication systems: a manual restart in a test mode, a manual restart and an automatic restart. The description is hereby incorporated by reference.

There is presently no conclusion in the prior art, which combination of criteria for shutting down and/or restarting the Raman amplifiers in the optical link could be used as the only efficient and reliable combination.

SUMMARY OF THE INVENTION

Table of Key Terms to be Used in the Following Description

Auxiliary optical channel—an optical channel not belonging to informational optical channels; for example, can be an OSC—Optical Supervisory Channel, an SVC—Supervisory Channel, or another additional channel.

Transmitting side (power) amplifier—an optical amplifier (usually a power Raman amplifier) situated at a transmitting side of an optical span or link.

Receiving side (power) amplifier—an optical amplifier (usually a power Raman amplifier) situated at a receiving side of an optical span or link.

Optical Span—usually, a set of two amplifiers separated by an optical fiber normally with length of a few tens of km.

Optical link—concatenation of a number (1 to n) of spans.

FWD (forward direction) Raman amplifier—Raman amplifier that pumps its high output power in the direction of the information carrying signals BWD (backward direction) Raman amplifier—Raman amplifier characterized in that it pumps high output power in the opposite direction to the information carrying signals.

LOS—Loss Of Signal.

Main band (e.g., C-band, 1530-1565 nm)—spectrum of wavelengths utilized for informational optical channels in WDM transmission.

Short band (S-band, 1460-1530 nm)—spectrum of wavelengths shorter than those of the C-band.

Low band (L-band, 1565-1625 nm)—spectrum of wavelength longer than those of C-band.

APR—Automatic Power Reduction, one of safety measures of Laser safety standards (IEC) in telecommunication systems.

ALS—Automatic Laser Shutdown, one of safety measures of Laser safety standards in telecommunication systems.

EDFA—Erbium Doped Fiber Amplifier.

The automatic restart procedure discussed in the prior art still leaves a possibility that in some cases, the power optical amplifiers can be switched on (even for a short time) when the fiber failure in the link is not yet repaired.

The practice says it is insufficient and not reliable to base the decision of shutting down pumps of the Raman amplifier only on one criterion, for example only on the absence of a signal in a supervisory channel (OSC, SVC, an auxiliary channel, etc.). In other words, a random fault of the supervisory channel transmitter must not lead to the loss of a great amount of information carried by the communication link.

The concept of the invention is providing an improved method of controlling (shutting down and/or restarting) of a power optical amplifier in an optical link; since the optical link usually comprises a transmitting side optical amplifier and a receiving side optical amplifier, the method in its various aspects relates to any of the amplifiers and both of them together on the link.

According to a first aspect of the invention, there is provided a method of controlling an optical amplifier in an optical link comprising a transmitting side of said link, an optical fiber span and a receiving side of said link, wherein said receiving side comprises said optical amplifier being a receiving side power amplifier;

the method comprises transmitting at least a first diagnostic signal via an auxiliary optical channel (SVC, OSC or the like) from the transmitting side towards the receiving side of the link;

the method performs shut down of the receiving side power amplifier in case of essentially simultaneously detecting, at said receiving side of the link, absence of the diagnostic signal and at least one of the following events:

drop of input signal in a main band carrying information optical channels (preferably, the main band is C-band; for example, the drop of power can be considered when the change is for about 0.5 dB);

power reduction of input signals in both the main band and a short band; (for example, power reduction in both the C-band and S-band for more than about 0.5 dB at each of them)

disappearance of a second diagnostic signal, in case it is transmitted from the transmitting side towards the receiving side of the link.

Preferably, the transmitting side of the link also comprises an optical amplifier (a transmitting side amplifier) which in turn may be a power amplifier.

The term "essentially simultaneously" should be understood as detecting said events within a specified time period (or time window) between one another. Owing to different transient processes which take place at various components of the link, only approximate examples can be presented, such as from a number microseconds to 3 seconds. The time window can be more exactly specified taking into account characteristics and parameters of the power amplifiers, of the fiber connectors, of effective length of the fiber span (see explanation below) and the like.

It should be noted that if the first diagnostic signal is lost and no one of the mentioned events is detected within the specified time period, the power amplifiers may remain in the working condition but are to be considered under alarm. If, at any time upon failure of the first diagnostic signal, the mentioned at least one event takes place, the power amplifier at the receiving side must be shut down since no risk can be taken any more. This situation is also in the scope of the above-defined method.

If any of the "additional" listed events takes place but the first diagnostic signal does not fail within the specified time period, no shut down is performed and no alarm is required.

Therefore, a risk of a false shut down is minimized to a negligible level. It should be noted that a double fault scenario is not considered in the ITU-T standardization documents when protection mechanisms are analyzed.

One specific version of the above method comprises a step of transmitting the second diagnostic signal via the optical link in the same direction. This solution, by using a double overhead approach, actually resolves the problem of a possible fault of the diagnostic signal transmitter.

It should be noted that the main band signal comprises a multiplexed signal of information optical channels transmitted at their corresponding wavelengths; the S-band signal comprises wavelengths shorter than the C-band.

The diagnostic signal is preferably a low frequency dithering signal transmitted via an auxiliary optical channel, for example as a modulating signal of the optical carrier.

Typically, the power optical amplifiers are Raman amplifiers; preferably, the transmitting side power amplifier is a Forward Direction (FWD) Raman amplifier, and the receiving side power amplifier is a Backward Direction (BWD) Raman amplifier.

Shutting down of the power amplifiers can be performed by shutting down their pumps, but can also be done by reducing the amplifiers to a very low power level which cannot lead to transmitting hazardous power signals.

The proposed list of events which can be detected almost simultaneously with disappearance of the first diagnostic signal in an optical link comprising power amplifiers can be described as follows. As known to those skilled in the art, optical amplifiers (and especially power amplifiers) are to be shut down in case of a fiber failure/disconnection in the optical link. It should be explained that one of the most important non-linear effects created by high power Raman amplifiers is Rayligh back scattering. This phenomena causes creation of noise in both the C-band and S-band, which is amplified not only in the direction of the Raman pump, but more importantly in this case, counter pump wise.

The Inventor generally classified the possible fiber failures into three types:

1. fiber cut remote from the receiving power amplifier; it is characterized by essential drop of power in the band of optical channels, (preferably, in the C-band);
2. fiber cut close to the receiving amplifier (within a so-called effective length, for example it can be of about 20 km); this distance is characterized by noise in C-band and S-band caused by the known effect of back pumping of Raman amplifiers. This noise makes it impossible to detect LOS which would normally be discovered after a fiber cut or disconnecting along the span. A fiber cut within the effective distance leads to a reduction of noise signals in the C-band and S-band
3. open connector of the receiving power amplifier causes the phenomena characteristic for type 2; in case of a flat surface of the fiber cross-section in the open connector, such a fault may also cause sharp increase in a so-called Back Reflection, up to reaching extremely high Back Reflection (HBR) exceeding a predetermined threshold.

The method may optionally comprise determining the type of fault that has caused shut down of the receiving side power amplifier; the determination (the diagnosis) can be based on specific combination of the events detected essentially simultaneously with the absence of said at least one diagnostic signal. The diagnosis preferably comprises indication of the type of fault.

Further, the method may comprise detailed analysis of the type of fault. For example, the amount of power returned as the High Back Reflection effect can be indicative of the distance from the receiving side power amplifier. In other words, knowing the returning power, the type of the amplifier and characteristics of the fiber, the distance can be calculated.

The method according to the first aspect of the invention may be utilized also in a case when said optical link is one unidirectional link from a pair of two unidirectional links forming together a bi-directional optical link.

There is also proposed a method of controlling an optical amplifier in an optical link comprising a transmitting side of said link, an optical fiber span and a receiving side of said link, wherein said transmitting side comprises said optical amplifier being a transmitting side power amplifier;

the method comprises shutting down the transmitting side power amplifier of the optical link upon detecting at least one of the following events:

reduction of power simultaneously in the main band and in the S-band at the output of the transmitting side power amplifier, High Back Reflection exceeding a predetermined threshold.

For the optical link that belongs to a bi-directional optical link, the above method includes shutting down of the transmitting side power amplifier also in case of detecting Loss of Signal (LOS) in the main band of informational optical channels at (or before) the input of the transmitting side power amplifier.

The above method may be performed together with the previously described method of shutting down the receiving side power amplifier.

The main band is typically C-band, though L-band can sometimes be used for transmitting of informational channels. The mentioned power reduction is, for example, in the range of more than 0.5 dB in the main band and in the S-band. However, it should be noted that the Raman effect occurs for any wavelength band whatsoever—for example the Raman effect can work also in 1300, 1400, 1600 nm ranges and fully depends of the lasers used in the Raman amplifier.

As noted, the above criteria are suitable for shutting down the transmitting side power amplifier in a bi-directional optical link. These criteria are independent from a method of shutting down the receiving side power amplifier (for example, the latter can be shut down without utilizing a diagnostic signal).

The above phenomena to be detected for shutting down the transmitting side power amplifier can be explained by the same three categories of the fiber faults listed with respect to the receiving side power amplifier.

According to a second aspect of the invention, there is proposed an improved method of controlling an optical amplifier in an optical link comprising a transmitting side of said link, an optical fiber span and a receiving side of said link, wherein said transmitting side comprises said optical amplifier being a transmitting side amplifier;

the method comprises transmitting a first and a second diagnostic counter-propagating signal from the receiving side towards the transmitting side of the link;

shutting down the transmitting side amplifier in case of detecting, at said transmitting side of the link, disappearance of said first and said second diagnostic counter-propagating signals.

In the preferred embodiment, the transmitting side amplifier is a power amplifier.

In one embodiment, the second diagnostic counter-propagating signal can be transmitted via an additional auxiliary optical channel.

The above-defined solution dramatically simplifies the process of shutting down the power optical amplifier at the transmitting side of the link, and allows performing it without interaction with another optical link usually serving the opposite traffic direction.

Using two diagnostic signals transmitted by separate transmitters renders the above method more reliable.

The method according to the second aspect of the invention (i.e., shutting down the transmitting side amplifier based on detecting disappearance of diagnostic counter-propagating signals) may be utilized also in a case when said optical link is one unidirectional link from a pair of two unidirectional links forming together a bi-directional optical link. It is independent from a method of shutting down the receiving side amplifier (i.e., the latter can be shut down without utilizing any diagnostic signal(s).

It is to be mentioned that to restart the receiving side amplifier (power or not), it is sufficient that presence of said at least first diagnostic signal be detected at the receiving side of the link.

According to a third aspect of the invention, there is proposed an improved method of controlling an optical amplifier in an optical link, wherein the optical link comprises a transmitting side of said link, an optical fiber span and a receiving side of said link, wherein said transmitting side comprises said optical amplifier being a transmitting side amplifier;

the method comprises transmitting a first diagnostic counter-propagating signal and a second diagnostic counter-propagating signal from the receiving side to the transmitting side of the link;

restarting the transmitting side amplifier, previously shut down, in case of detecting presence of at least one of said diagnostic counter-propagating signals at the transmitting side of the link.

The proposed method is most preferred for a case where the transmitting side optical amplifier is a power amplifier.

The above method of restarting the transmitting side power/nonpower amplifier is simple, fast and reliable, especially in comparison with the methods known in the prior art. These methods can be successfully implemented also in a bi-directional link.

According to a fourth aspect of the invention, there is further proposed a method for restarting a transmitting side power amplifier in a bi-directional link, improving a standardized ALS procedure described in the ITU-T G.664.

There is provided a method of controlling an optical amplifier in a bi-directional optical link consisting of a first and a second unidirectional optical links, each comprising a transmitting side, an optical fiber span, and a receiving side, wherein at least the first unidirectional link at its transmitting side comprises said optical amplifier being a transmitting side power amplifier;

the method comprises:

a) transmitting at least a first diagnostic signal via an auxiliary optical channel from the transmitting side of the first unidirectional link towards the receiving side of the first unidirectional link, and performing the following operations for restarting the transmitting side power amplifier of the first unidirectional link in case said amplifier has been shut down b) applying restart pulses having duration X and periodicity T (X<T) towards the transmitting side power amplifier, c) verifying connectivity of the first unidirectional link by monitoring presence of said at least first diagnostic signal at the receiving side of said link, d) ensuring applying of power exceeding a LOS threshold toward the input of the transmitting side power amplifier whenever the connectivity is restored, e) allowing the transmitting side power amplifier to restart only after time greater than X, during which its input power exceeded said LOS threshold.

It should be clarified that in case the transmitting side power amplifier of the first unidirectional link is shut down (for example, due to a fiber cut in the first unidirectional link), power applied to its input does not exceed a LOS (Loss Of Signal) threshold. This is ensured owing to an SD (Shut Down) command received at the receiving side of the first unidirectional link via the second unidirectional link, in case of detecting the fiber cut at the receiving side of the first link; the mechanism will be explained in more detail with reference to FIG. 2.

To implement the above method, a delay $(X+\Delta)<T$, can be introduced by providing a delay circuit at the input of the transmitting side power amplifier.

In a further embodiment, the first unidirectional optical link may comprise a booster preceding the transmitting side power amplifier, and the method may comprise introducing said delay $X+\Delta$ also to said booster by providing the booster with a booster delay circuit to ensure that the power level of a restart pulse transmitted with the duration X to the optical link will never have time to be amplified above a safety threshold. For example, the safety threshold for class 1 is 10 dBm. Therefore, the method guarantees that power caused in the link by the restart pulse will not rise higher than 10 dBm for $X+\Delta$, so the system will not violate class 1 safety once the fiber is cut.

There is yet a further version of the method defined above, wherein the delay is introduced only in a booster preceding the transmitting side power amplifier, in this version the step of applying the restart pulses comprises applying thereof to said booster, while enabling the booster to produce output power above a safety threshold only upon expiration of said delay;

whenever the connectivity is restored (and reported via the second unidirectional link to the transmitting side of said first unidirectional link), the method further comprises applying a main band power level to the booster, thereby enabling said booster to restart the transmitting side power amplifier upon expiration of said delay counted from the leading edge of either a restart pulse or the power level, whatever comes earlier.

Preferably, the booster (say, an EDFA amplifier) introduces a delay $X+\Delta$, $(X+\Delta<T)$, said delay being synchronized with the leading edge of a power level exceeding the LOS threshold applied to the booster, being it a next restart pulse or the main band power level. It can be performed by enabling the booster to gradually or stepwise increase its output power (to be the input power of the transmitting side Raman amplifier) during the delay period $X+\Delta$, so that at the end of said period the output power of the booster, if required, be sufficient to fully activate the Raman amplifier of the transmitting side.

Value of the "$\Delta$" for any of the versions, can be selected taking into account specific safety requirements and various limitations of the optical link. Ranges of delta can be, for example, (0-few seconds). Ranges of output power of the booster can be, for example, of about 10-23 dBm, and ranges of the Raman output power can be of about 20-40 dBm.

The restart pulses are applied at the main band and have the amplitude exceeding the LOS threshold. According to the mentioned standard, the main band is the band which carries information channels. It should be kept in mind that the restart procedure also includes applying corresponding pulses of the diagnostic signal in the auxiliary channel.

Restoration of the connectivity is immediately followed by sensing the diagnostic signal at the receiving side of the first unidirectional link, restarting the receiving side power amplifier of the first link, which fact is immediately reported to the transmitting side of the first link via the opposite (second) unidirectional link of the bi-directional link. (The report is actually disappearance of a Shut Down (SD) command, which was received all the time the fiber cut was present). The report is immediately interpreted by starting the transmitting laser and appearance of the main band (C-band) signal at the input of the booster. Presence of the C-band signal at the input of the booster for the period more than X can be caused only by detecting integrity of the fiber, which means that the fiber cut/failure has been repaired.

As has been mentioned above, both the transmitting side of the link and the receiving side of the link usually comprise optical amplifiers; in our particular case they both can be power optical amplifiers. The power optical amplifiers are typically Raman amplifiers; preferably, the transmitting side power amplifier is a Forward Direction (FWD) Raman amplifier, and the receiving side power amplifier is a Backward Direction (BWD) Raman amplifier. The restart of the power amplifiers is performed by restarting their pumps. The mentioned at least one diagnostic signal is preferably a low frequency signal as it enables its detection without amplification over long spans (required at the start up stage when Raman amplifiers are still in their shut mode).

The above-defined improvement of the restart process is in that the Inventor proposes to add to the standard automatic restart process (ALS) a condition preventing activation of the transmitting side Raman amplifier pumps without getting a stable proof that there is no fiber cut/open connector in the link. Otherwise, high energy of the Raman amplifier might result in a damage at the place of fiber cut. First of all, the invention prevents automatic restart of the transmitting Raman amplifier each time the standard ALS process "tries" doing that during the period "X". It is performed by preventing the booster from generating its high (above a defined hazard level, e.g class 1=10 dBm) output power during the time period equal to the duration of a standard restart pulse. The high power is generated with a delay (say, by introducing a timer circuit) set for the time longer than the predetermined "X" seconds. Thus, at each cycle of the standardized ALS process, the proposed method allows skipping the undesired automatic attempt to restart the Raman amplifier, during the standard "X" seconds. The novel proposed artificial "delay" timer set for "$X+\Delta$" allows the restart when the fiber cut is repaired, i.e., when the input power is applied towards the power amplifier for the time period longer than X.

The proposed method of the improved automatic restart (and a system implementing the method) can be compatible with the standardized ALS procedure described in the ITU-T G.664.

However, the restart pulses X can be much shorter than those recommended in the above standard, thus the restart procedure may be performed much faster. For example, X can be set for 100 ms, so that the whole cycle can be closed in less than 500 ms.

BRIEF DESCRIPTION OF THE DRAWINGS

The invention will be further described with reference to the following non-limiting drawings, in which.

DETAILED DESCRIPTION OF THE PREFERRED EMBODIMENTS

Figure 1A:
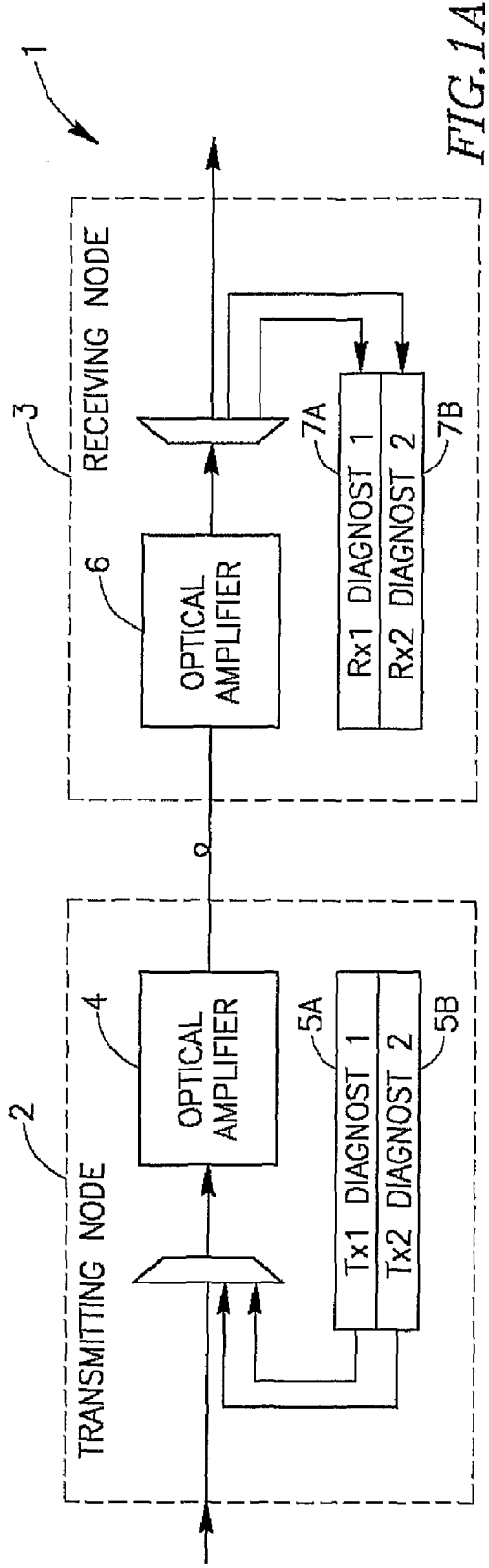
FIG. 1A schematically illustrates a unidirectional optical link comprising a transmitting side power optical amplifier and a receiving side power optical amplifier, and equipment for producing two diagnostic signals to be launched in the direction of transmission.

FIG. 1A illustrates an exemplary unidirectional link 1 comprising an optical fiber span extending between a transmitting node 2 and a receiving node 3. The transmitting node 3 usually comprises an optical amplifier 4 and two transmitters 5A and 5B of a diagnostic signal 1 and a diagnostic signal 2, respectively. The two diagnostic signals are transmitted via two separate optical auxiliary channels, though (in principle) may be propagated through one common optical channel in the form of two different modulating signals. The node also comprises a coupler (multiplexer) for transmitting the two diagnostic signals along the optical link, multiplexed with signals of the informational optical channels incoming the transmitting node. The node 2 may additionally comprise other equipment which is not discussed with reference to this drawing.

The receiving node 3 comprises an optical amplifier 6. It also contains two receivers 7A and 7B of the diagnostic signals 1 and 2 connected to the link via a splitter (filter, demultiplexer); the receivers may be provided with, or operate themselves as detectors D1 and D2 of the two diagnostic signals.

The amplifiers 4 and 6 are preferably power optical amplifiers which must be immediately (i.e., according to strict time requirements specified in relevant standards) shut down whenever a fault occurs in the optical link.

Using the embodiment of FIG. 1a, in case of a fiber cut in the link, the amplifier 6 of the receiving node 3 can be shut down based on detection of absence of both diagnostic signals. If only one of the signals has disappeared, it would just mean that one of the transmitters 5A or 5B (or receivers/detectors 7A,7B) has failed. The receiving node 3 may optionally comprise additional monitors/detectors, for example a C-band detector, an S-band detector. The additional detectors, in combination with detection of at least one of the diagnostic signal at the receiving node, can be used for sensing a fault in the optical link (see a unidirectional link 12 in FIG. 2). Upon detecting the fault, the amplifier 6 of the receiving node 3 will be shut down.

The illustrated solution suits for a unidirectional optical link, but it can be used in each unidirectional link of a bi-directional optical link.

If the unidirectional link 1 is not part of a bi-directional link, shut down of the amplifier 4 at the transmitting node is quite problematic since it does not receive any information (alarms) from its own fiber span. The fault might probably be determined by detecting increased Back Reflection from the cut surface, and/or by quite sharp reduction in the noise power at C-band and S-band at the output of the amplifier 4.

In any case, shutting down the transmitting side amplifier 4 by no means can be based on disappearance of the diagnostic signals 1 or 2, since it can indicate nothing more than operability of the diagnostic signals transmitters.

Figure 1B:
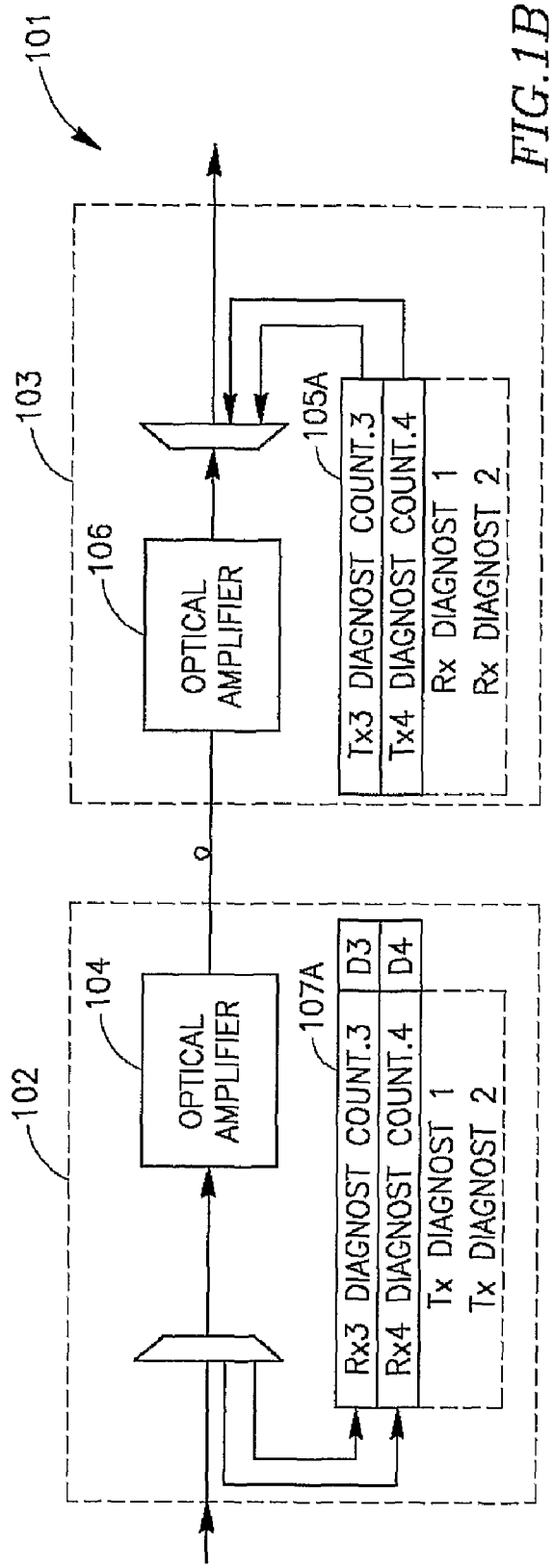
FIG. 1B schematically illustrates a unidirectional optical link comprising a transmitting side power optical amplifier and a receiving side power optical amplifier, and equipment for two (or more) diagnostic signals which may be used in both the direction of transmission, and the opposite direction.

FIG. 1B proposes a solution for reliable detection of fiber faults at a receiving node of an exemplary unidirectional link. Of course, the solution can be used also for bi-directional optical links. FIG. 1B shows a unidirectional link 101 that incorporates equipment for transmitting two "counter-propagating" diagnostic signals 3 and 4. Both these diagnostic signals 3 and 4 are transmitted in the direction opposite to the traffic channels, via one or two auxiliary optical channel(s). The solution is based on the fact that optical fibers can be used for transmitting information in two opposite directions.

Since in this embodiment the transmitting node 102 becomes a receiving node for the diagnostic counter-propagating signals 3 and 4, this transmitting node 102 is able to easily detect a fault in the link if both of the diagnostic counter-propagating signals disappear. If one of the counter-propagating signals is not detected, it may only mean failure of the corresponding transmitter Tx. Actually, the unidirectional link may utilize only one transmitter 105A and one receiver 107A for a diagnostic counter-propagating signal 3 transmitted from the node 103 to the node 102. Even in this case the transmitting node 102 will be capable of detecting fiber faults in the link quite reliably (by sensing absence of the signal 3). In case the amplifier 104 is a power amplifier (say, a Raman amplifier), reliability of the fault detection at the transmitting node 102 can be increased if some other physical phenomena are detected simultaneously with disappearance of the utilized counter-propagating channel(s). For example, these factors can be a) the increased Back Reflection b) reduction of noise in the C-band and/or S-band at the output of the amplifier 104.

FIG. 1B shows a preferred specific embodiment where the unidirectional link 101 is also provided with equipment for transmitting one or more co-propagating diagnostic signals 1 and 2.

Figure 2:
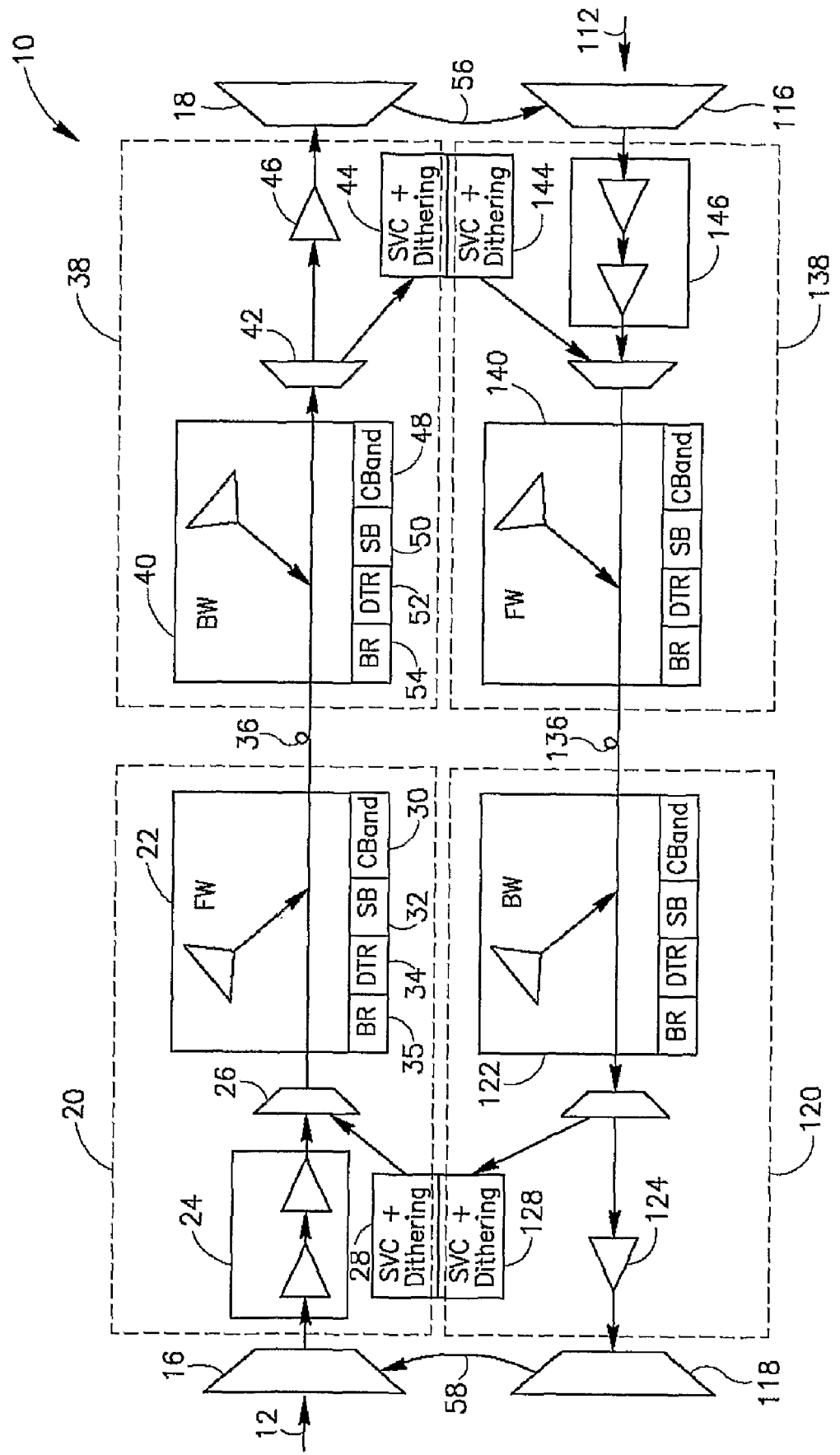
FIG. 2 schematically illustrates an example of a bi-directional optical transmission link composed of two unidirectional links each comprising a pair of Raman amplifiers.

FIG. 2 shows a bi-directional optical link 10 comprising two unidirectional links 12 and 112 serving opposite transmission directions. In this particular example, each of the links 12 and 112 extends between a multiplexer 16 (116) and a demultiplexer 18 (118). Transmitting lasers of the links are not shown. The scheme of FIG. 2 is relevant also for single channel applications.

In this embodiment, multiplexed information optical channel(s) issued by the multiplexer 16 as a C-band signal are fed to block 20 that contains a transmitting Raman amplifier 22. The block 20 also comprises an EDFA amplifier (shown as a two-stage amplifier or booster 24) and a multiplexer 26 combining the multiplexed C-band signal with a dithering (diagnostic) signal transmitted by a dithering transmitter 28 via an auxiliary optical SVC channel. The block 20 is provided with at least four detectors schematically shown in this embodiment as four square fields 30, 32, 34, 35 within the Raman amplifier sub-block 22. Actually, the Raman amplifier sub-blocks 22 and 40 in the link 10 can be performed as identical printed circuits comprising one and the same set of monitoring detectors. In this embodiment, the transmitting power amplifiers 22 and 140 (in the respective links 12 and 112) are FWD Raman amplifiers, and the receiving power amplifiers 40 and 122 (of the links 12 and 112) are BVD Raman amplifiers.

The detectors 30, 32, 34, 35 are respectively responsible for monitoring power of the: C-band signal, Short band (S-band or noise) signal, the dithering signal, and back reflection BR, and can be placed at any position within the block 20. The transmitting amplifier's block 20 is connected, via a fiber span 36, to a block 38 containing a receiving amplifier 40. The block 38, in addition to the Raman amplifier 40 (in this case, the BWD Raman), comprises a demultiplexer (splitter) 42 for splitting the C-band information optical channels from the SVC channel, a dithering channel receiver 44 and an additional amplifier 46 that is further connected to the multiplexer 18. Similarly to the block 20, block 38 comprises monitoring detectors of the C-band signal 48, of the S-band signal 50, of the dithering signal 52 and of the back reflection BR 54, The monitoring detectors are shown as an example within the receiving Raman amplifier sub-block 40.

The optical link 112 serving the opposite transmission direction comprises similar components marked by similar respective numbers (120, 138, etc.).

It should be understood that the optical fibers 36 and 136 of the bi-directional communication link 10 extend between two nodes, wherein multiplexer 16, block 20 demultiplexer 118 and block 120 belong to one of the nodes, and demultiplexer 18, block 38, multiplexer 116 and block 138 belong to the other node. A transmitter and a receiver of the dithering signal belonging to one and the same node (say, 28 and 128) preferably form a common functional block and may serve identical auxiliary optical channels in the two optical links.

The nodes collect information concerning connectivity of the two unidirectional links 12 and 112 and operability of the relevant equipment, and constantly exchange the relevant information with one another.

For example, if a fiber cut occurs in the span 36 (marked with a dotted cross) and takes place quite far from the block 38, it can be detected at the receiving block 38 by simultaneously detecting LOS of the dithering signal in SVC and essential power drop in the C-band. The receiving Raman amplifier 40 will be therefore shut down and the Shut Down signal SD will be transmitted to the demultiplexer 18, from which it is sent to the multiplexer 116 of the opposite link 112 (see a schematic signaling arrow 56).

Once the BWD is shut, LOS is detected at the amplifier 46 following it, which causes it to shut. This creates LOS at the Demultiplexer (DMUX) 18, which might cause SD command for the MUX 116 on link 112 (arrow 56).

Moreover, there can be another scenario where the LOS at the DMUX propagates to the Rx of the transceiver (not shown) located after the DMUX. The Rx than creates a SD command to the Tx. (SD at the MUX 116 will cause LOS in 146 and consequently its shut down, which will cause a LOS in 140 and hence its shut down.

In parallel, the absence of the dithering signal in SVC, and the shut down of the BWD Raman 40 create a LOS in the receiver 44 causing a SD command for transmitter 144.

So, as we have seen above, link 112 will also be shut down, as the receiving amplifier (BWD Raman amplifier) 122 will have a simultaneous drop in C band and LOS of a dithering signal of the link 112.

Shut down of 122 will cause LOS at preamplifier 124, which will shut down and cause LOS in Demultiplexer 118. A shut down (SD) signal will be immediately sent from the Demultiplexer 118 to the multiplexer 16 (arrow 58), and the C-band signal at the input of the block 20 will be ceased, thus causing LOS at booster amplifier 24 input, causing it to shut and hence causing LOS at the FWD Raman amplifier 22 input, which in turn causes it to shut down, thus accomplishing the purpose of the mechanism (as no hazardous laser light is emitted to the cut or disconnected fiber).

If the fiber cut occurs closer to the receiving block 38, it can be detected at this block by sensing the absence of the dithering signal accompanied by a sharp reduction of noise in at least one of the C-band and S-band. In case there is an open fiber connector in the receiving block 38, the absence of the dithering signal will be further accompanied by a High back Reflection over a known threshold specified for each particular Raman amplifier/connector.

It should be noted that "shut down of a Raman amplifier" is to be understood as shutting down its power pumps or, say, reducing the pumps to a very low level so as not to transmit hazardous power levels to the optical line. A similar statement applies to ways of shutting down the booster.

Now, let us consider that upon shutting down pumps of the Raman amplifiers, the link must be restored, so the Raman amplifiers are to be re-started. The restart process is standardized by the ALS procedure described in the ITU-T G.664. The present invention proposes utilizing the standardized ALS procedure, but in an enhanced version that is made to improve both safety of the restart and the reaction time.

For example, the duration of the restart pulses can be e.g., 100 ms (compare to 1.75-2.25 s according to the mentioned Standard), so that the whole circle is closed in less than 500 ms.

One version of the method of restart will be described with reference to both FIG. 2 and FIGS. 3A-3D. The standardized ALS procedure can be implemented using an ALS timer (FIG. 3A; not shown in FIG. 2) that produces periodical pulses of the logical level "1" with the duration X. Simultaneously, the ALS timer monitors whether connectivity of the link 12 is restored. The ALS timer controls periodic activation of both the main band and the auxiliary channel (SVC) carrying the diagnostic dithering signal, thus trying to resume contact every period "T" for time "X". The ALS procedure is usually performed at both unidirectional links, but for the sake of simplicity, will be explained below with respect to one of the links.

As have been explained before, restoration of the link 12 can be sensed at the block 38 if a dithering signal is detected in the SVC channel. Detection of the dithering signal is the sufficient criterion of re-activating the receiving power amplifier 38. Provided that all the signaling between the unidirectional links operates as usual, the link 112 restores its normal operation and provides the ALS timer with such an indication.

Figure 3A:
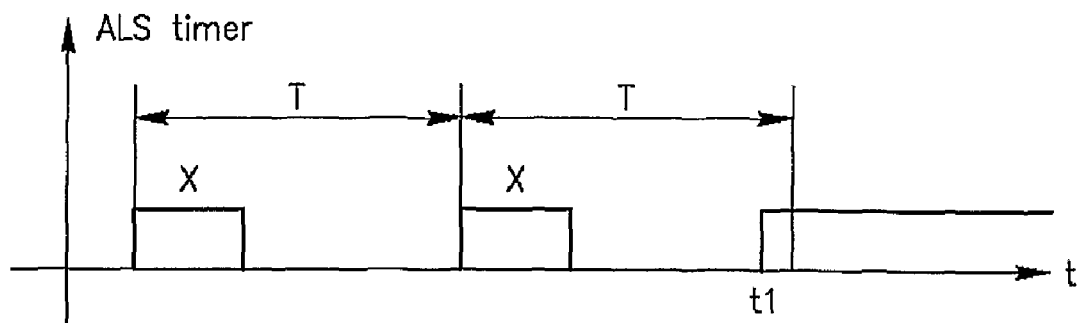
FIGS. 3A to 3D are schematic time diagrams illustrating one of the proposed methods of restarting the transmitting side power amplifier.
Figure 3B:
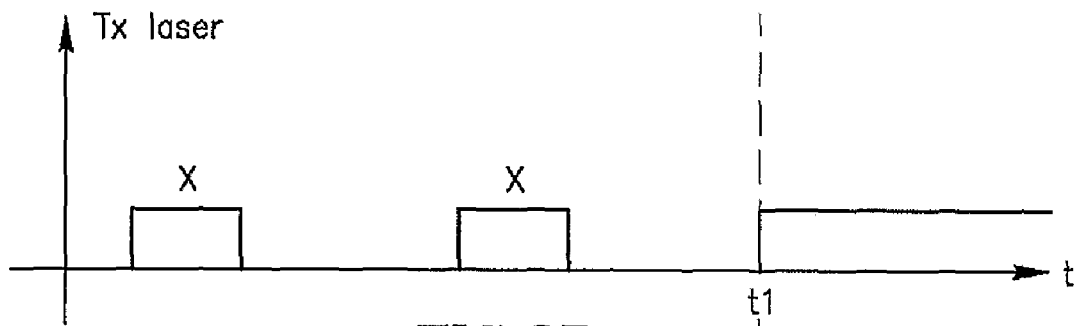
Figure 3C:
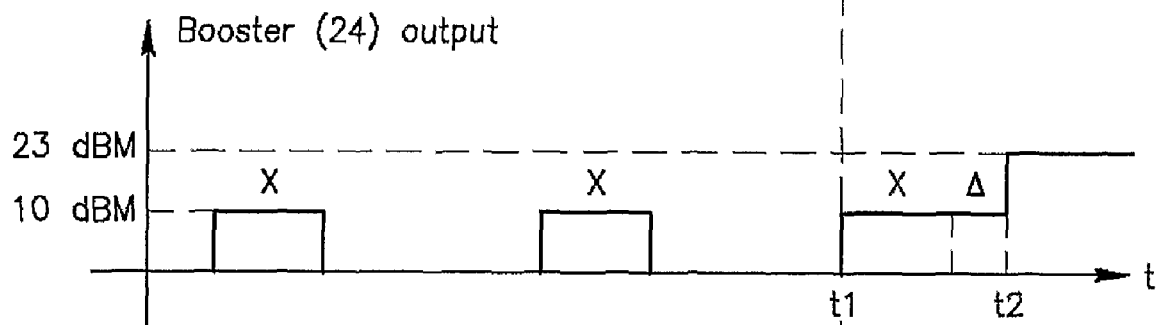

Suppose that at the moment t1 the ALS timer received a signal about integrity of the link 12 and started generating a constant positive logical level "1". The ALS timer correspondingly initiates an exemplary laser transmitter (Tx laser—not shown in FIG. 2) to apply C-band restart pulses having duration X (two such pulses are shown; their duration can be standard or shortened) and, beginning from the moment t1-the level ("a step") of the C-band signal to a booster 24. The amplitude of the signals is greater than the Loss Of Signal (LOS) threshold but does not exceed the level 1 safety requirements. The time diagram of the laser Tx is shown in FIG. 3B and is logically similar to the time diagram of the ALS timer (diagram of FIG. 3A).

Alternatively, the control logical levels of the ALS timer, instead of being applied to the channels' laser transceivers, can be used at the MUX 16 (say, at its output interface) or at a preamplifier of the Booster 24. In this case the channels' transceivers are constantly active.

According to the concept, the transmitting side power amplifier 22 is not allowed to restart its power pumps in response to any of those pulses, as long as the fiber cut is not repaired. According to the version illustrated in FIG. 3, the booster 24 operates as a delay circuit which has the delay time "X1=X+Δ" greater than "X" but smaller than T and is synchronized to the beginning of a C-band input signal, whether the signal is a standard pulse of the duration X or "the step" caused by elimination of the fiber cut (—see FIG. 3C). The booster 24 increases its output power step-wise in response to the applied input power, so as to remain at the safe level 10 dBm during the pulse X plus the "spare" additional time Δ, and to reach its full output power sufficient for re-starting the Raman amplifier 22 only at the end of its delay time X+Δ (of course, if the booster's input power so dictates).

According to an alternative and more preferred version, both the booster 24 and the FWD Raman amplifier are provided with the same timer (counter) X+Δ. Once the Booster 24 is out of LOS (i.e., its input power exceeds a Loss Of Signal threshold), it immediately starts amplifying with output power not greater than a predefined safety threshold (e.g. 10 dBm). Only after X+Δ, and if dictated by the value of its input power, the booster 24 will go up to required powers greater than 10 dBm. (Not always the booster output is required to be above 10 dBm. For example, a single channel will be transmitted with 5 dBm, so even after X+delta the output power does not have to change.) The Raman amplifier 22 also starts its X+Δ counter from the moment it is out of LOS. And than, independent of what the input power is (being the output power of the booster 22), as long as it is above its LOS threshold, the Raman amplifier 22 will start amplifying after time X+Δ.

Figure 3D:
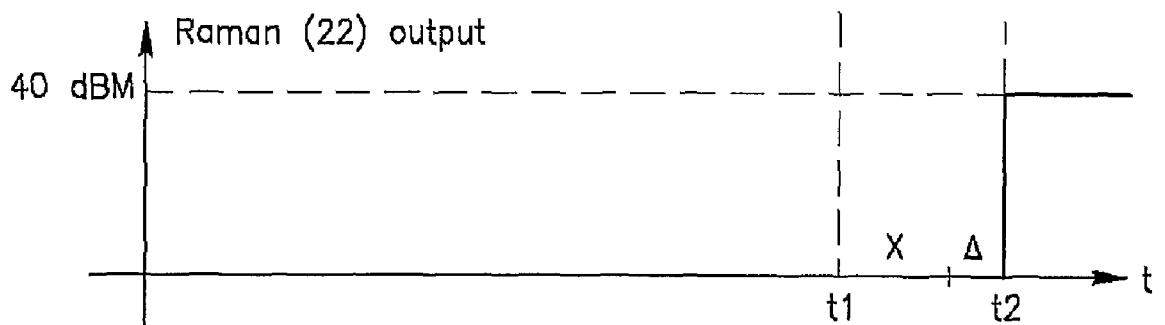

The time diagram of FIG. 3D illustrates restart of the Raman amplifier 22 that takes place at the moment t2, according to any one of the described versions.

The proposed method allows performing a safe restart of both the Booster amplifier 24 and the power Raman amplifier 22.

The restart pulses X can be much shorter than those recommended in the standard (1.75-2.25 sec), thus the restart procedure may be performed much faster. For example, X can be set for 100 ms, so that the whole cycle is closed in less than 500 ms.

It should be appreciated that the above description comprises only some exemplary combinations of criteria useful for making the shut down and restart decisions concerning the power optical amplifiers in optical links. Additional variations of the criteria that can be proposed and remain in the frame of the spirit of the invention and the scope of the claims presented below, should be considered part of the invention.

The invention claimed is:

1. A method of performing error-free shut down of an optical power amplifier in an optical link comprising a transmitting side of said link, an optical fiber span and a receiving side of said link, wherein said optical power amplifier is a transmitting side power amplifier or a receiving side power amplifier;
   the method comprises
   shutting down said optical power amplifier in case of essentially simultaneously detecting at least two of the following events at the side of said link associated with the optical power amplifier:
   drop of input signal in a main band carrying information optical channels;
   power reduction in both the main band and a short band of signals: at the input of said amplifier if being the receiving side power amplifier, or at the output of said amplifier if being the transmitting side power amplifier;
   disappearance of a first diagnostic signal, if transmitted to the side of the link associated with said power amplifier from the other side of the link
   disappearance of a second diagnostic signal, if transmitted to the side of the link associated with said power amplifier from the other side of the link;
wherein, in case said amplifier is
the transmitting side power amplifier of said optical link, belonging to a bi-directional optical link, shutting down said amplifier upon detecting the following events:
   the drop or Loss of Signal (LOS) in the main band of informational optical channels to be applied to the input of the transmitting side power amplifier,
   the reduction of power both in the main band and in the short band at the output of the transmitting side power amplifier.

2. A method of performing error-free shut down of an optical power amplifier in an optical link comprising a transmitting side of said link, an optical fiber span and a receiving side of said link, wherein said optical power amplifier is either a transmitting side power amplifier or a receiving side power amplifier;
   the method comprises
   shutting down said optical power amplifier in case of essentially simultaneously detecting at least two of the following events at the side of said link associated with the optical power amplifier:
   drop of input signal in a main band carrying information optical channels;
   power reduction in both the main band and a short band of signals: at the input of said amplifier if being the receiving side power amplifier, or at the output of said amplifier if being the transmitting side power amplifier;
   disappearance of a first diagnostic signal, if transmitted to the side of the link associated with said power amplifier from the other side of the link;
   disappearance of a second diagnostic signal, if transmitted to the side of the link associated with said power amplifier from the other side of the link;
wherein, in case said amplifier is a transmitting side power amplifier and in case the method comprises
   transmitting the first diagnostic counter-propagating signal and the second diagnostic counter-propagating signal from the receiving side towards the transmitting side of the link,
   the shut down the transmitting side power amplifier is performed in case of detecting, at said transmitting side of the link, disappearance of said first and said second diagnostic counter-propagating signals.

3. The method according to claim 2, comprising transmitting the first and the second diagnostic counter-propagating signals from the receiving side of the link towards the transmitting side of the link via separate auxiliary counter-propagating channels.

4. The method according to claim 2, further comprising
   restarting the transmitting side power amplifier, previously shut down, in case of detecting presence of at least one of said diagnostic counter-propagating signals at the transmitting side of the link.

5. A method of controlling an optical amplifier in a bi-directional optical link consisting of a first and a second unidirectional optical links, each comprising a transmitting side, an optical fiber span and a receiving side, wherein at least the first unidirectional link at its transmitting side comprises said optical amplifier being a transmitting side power amplifier;
   the method comprises:
   a) transmitting at least a first diagnostic signal via an auxiliary optical channel from the transmitting side of the first unidirectional link towards the receiving side of the first unidirectional link, and
   performing the following operations for restarting the transmitting side power amplifier of the first unidirectional link upon said amplifier has been shut down
   b) applying restart pulses having duration X and periodicity T (X<T) towards the transmitting side power amplifier,
   c) verifying connectivity of the first unidirectional link by monitoring presence of said at least first diagnostic signal at the receiving side of said link, d) ensuring applying of power exceeding a LOS threshold toward the input of the transmitting side power amplifier whenever the connectivity is restored, e) allowing the transmitting side power amplifier to restart only after time greater than X, during which its input power exceeded the LOS threshold.

6. The method according to claim 5, further comprising providing a delay circuit with a delay time $X+\Delta(X+\Delta<T)$ at the input of said transmitting side power amplifier.

7. A method of performing error-free shut down of an optical power amplifier in an optical link comprising a transmitting side of said link, an optical fiber span and a receiving side of said link, wherein said optical power amplifier is either a transmitting side power amplifier or a receiving side power amplifier;

the method comprises shutting down said optical power amplifier in case of essentially simultaneously detecting at least two of the following events at the side of said link associated with the optical power amplifier:

drop of input signal in a main band carrying information optical channels;

power reduction in both the main band and a short band of signals: at the input of said amplifier if being the receiving side power amplifier, or at the output of said amplifier if being the transmitting side power amplifier;

disappearance of a first diagnostic signal, if transmitted to the side of the link associated with said power amplifier from the other side of the link;

disappearance of a second diagnostic signal, if transmitted to the side of the link associated with said power amplifier from the other side of the link, wherein in case said power amplifier is a receiving side power amplifier, transmitting at least a first diagnostic signal via an auxiliary optical channel from the transmitting side towards the receiving side of the link;

shutting down said receiving side power amplifier in case of essentially simultaneously detecting, at said receiving side of the link, absence of said first diagnostic signal and at least one of the following events:

the drop of input signal in a main band carrying information optical channels;

the power reduction of input signals in both the main band and a short band;

disappearance of the second diagnostic signal, in case it was transmitted from the transmitting side towards the receiving side of the link.

8. The method according to claim 7, comprising leaving said receiving side power amplifier in its working condition upon detecting absence of said first diagnostic signal while all of said events are absent, and shutting down said receiving side power amplifier whenever said first diagnostic channel remains absent and any of said events takes place.

9. The method according to claim 7, comprising preliminarily transmitting the second diagnostic signal in parallel to the first diagnostic signal, the method further comprises restarting the receiving side power amplifier upon being shut down, whenever at least one of said diagnostic signals is detected at the receiving side of the link.

10. The method according to claim 9, wherein said first unidirectional link comprises a booster preceding said transmitting side power amplifier, wherein the step (d) comprises applying power greater than the LOS threshold to the input of said booster whenever the connectivity is restored, the step (e) comprises allowing said booster to produce output power exceeding a safety threshold, if the power greater than the LOS threshold is applied to its input for a time period longer than X;

applying the output power of said booster to said transmitting side power amplifier.

11. The method according to claim 10, further comprising providing a delay circuit with a delay time $X+\Delta(X+\Delta<T)$ at the input of said booster and/or at the input of said transmitting side power amplifier.

* * * * *